United States Patent [19]

Geis et al.

[11] Patent Number: 4,507,102
[45] Date of Patent: Mar. 26, 1985

[54] DEVICE FOR MOUNTING THE DEFLECTION ROLLERS OF A RULING MEANS DRIVE

[75] Inventors: Heinz Geis, Frankfurt; Heinz Lautenschlager, Florstadt; Harmut Schulte, Glauburg; Siegmund Uliczka, Langen, all of Fed. Rep. of Germany

[73] Assignee: Triumph-Adler A.G. fur Buround Informationstechnik, Nuremberg, Fed. Rep. of Germany

[21] Appl. No.: 478,624

[22] Filed: Mar. 23, 1983

[30] Foreign Application Priority Data

Mar. 24, 1982 [DE] Fed. Rep. of Germany ..... 32107587

[51] Int. Cl.³ ........................... F16H 7/08; B41J 19/00
[52] U.S. Cl. ..................................... 474/101; 400/320
[58] Field of Search ........ 474/101, 117, 135, 148–150; 400/320, 322, 335

[56] References Cited

U.S. PATENT DOCUMENTS 3,882,988 5/1975 Sloan et al. .................. 400/320 X
4,286,888 9/1981 Bennett et al. ................... 400/320

Primary Examiner—Stephen J. Novosad
Assistant Examiner—Thuy M. Bui
Attorney, Agent, or Firm—Joseph R. Spalla

[57] ABSTRACT

An assembly for mounting deflection rollers about which a belt extending between machine side walls is trained comprises plug-in parts which enable the deflection rollers to be assembled one to one machine side wall, and the other to a guide plate supported by and adjustably spaced outwardly of another side wall with the spacing establishing belt tension which holds the assembly together. The guide plate also mounts a detector for monitoring the rotary position of the deflection roller.

1 Claim, 1 Drawing Figure

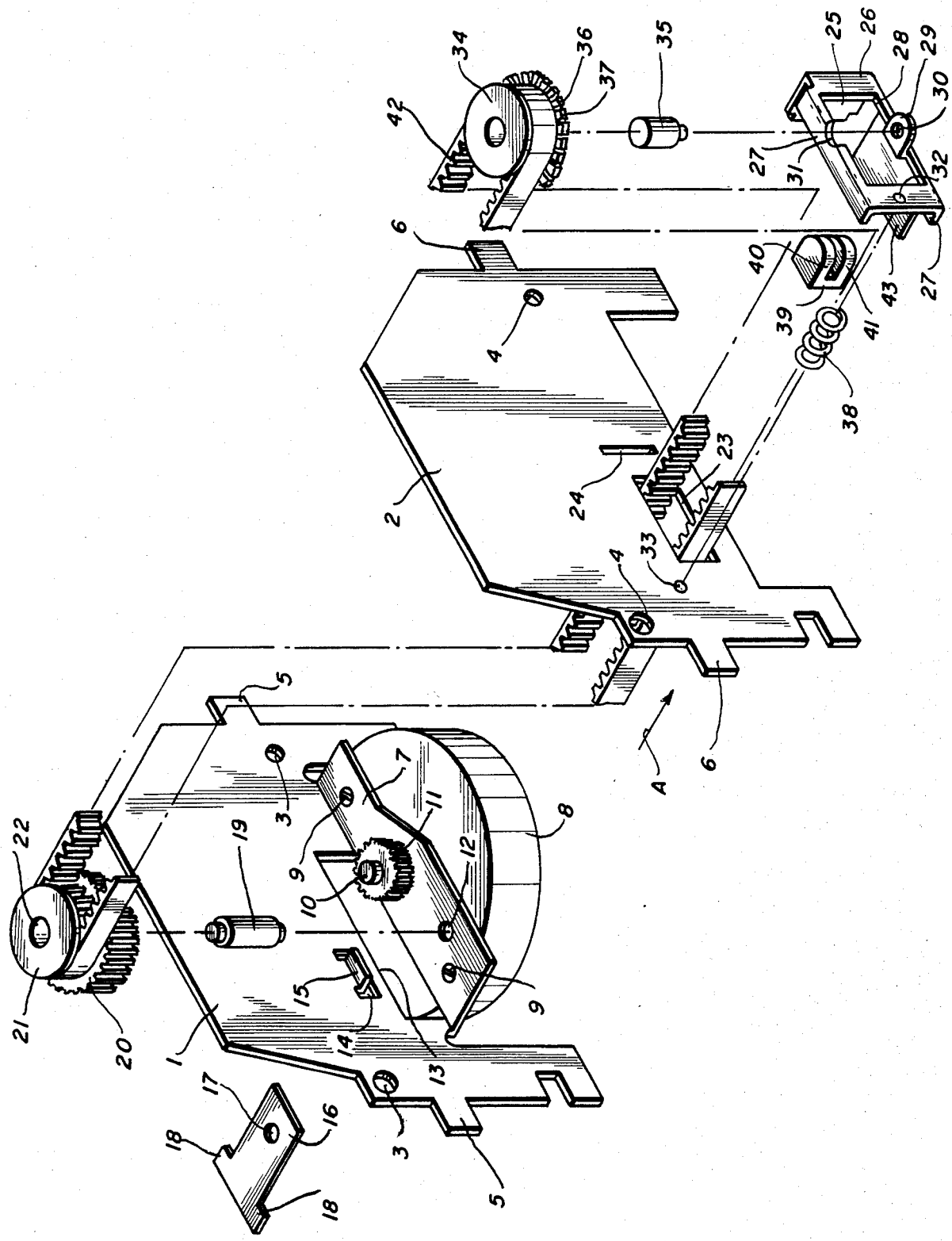

DEVICE FOR MOUNTING THE DEFLECTION ROLLERS OF A RULING MEANS DRIVE

This invention relates to an assembly for mounting deflection rollers of a belt drive; more particularly it relates to an assembly for mounting deflection rollers and a belt trained between deflection rollers characterized by plug-in parts maintained in assembled positions by belt tension.

Belt drives are employed in typewriters and printers to move a carriage supporting a printing element such as a print disc across a writing line. The belt which is secured to the carriage is trained about drive and idler deflection rollers mounted in left and right side frames. The mounting assemblies of deflection rollers are complicated and costly to assemble requiring screwed on or riveted bearing brackets requiring significant adjustment procedures.

In accordance with the invention there is provided a deflection roller mounting assembly characterized by parts which plug together without the necessity for screws, rivets, or the like and which when assembled are maintained in proper operative arrangement by belt tension which is established by a single adjusting screw or compression spring. Oftentimes the position of the carriage must be known and this is accomplished by detectors associated with a light barrier device on, for example, one of the deflector rollers. In accordance with the invention the detector can be mounted on the adjustable deflection roller support.

An object of the invention is in the provision of a facile mounting assembly for deflection rollers of a belt drive system which is simple to produce and assemble with minimal adjustment.

Another object of the invention is to provide a plug-in assembly of parts for mounting deflection rollers of a belt drive system in which belt tension maintains the assembly.

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

The single FIGURE of the drawing is an exploded perspective view of parts comprising the deflection roller mounting assembly of the invention.

By way of preface the invention is particularly described in connection with a printer or typewriter wherein a movable carriage supports a print element and wherein the carriage is moved by a belt. It is to be understood however that the invention may find use in other machines characterized by a movable carriage.

Referring now to the drawing the single FIGURE shows a printer whose frame comprises spaced left and right sidewalls 1 and 2 which are designed as stamped and formed parts which may be interconnected by a platen, rods, etc. (not shown in the drawing) supported by mounting holes 3 and 4. The purpose of the protrusions 5 and 6 formed on the sidewalls 1 and 2 is to join the sidewalls 1 and 2 to a bottom pan (not shown) comprising the printer frame.

The left sidewall 1 has in its central area an offset or shelf 7 beneath which an electric motor 8 is fastened as by screws 9. A pinion 11 is provided on the motor shaft 10 and fixed to it above the shelf 7. In addition, the offset 7 has a hole 12. A cutout 13 is provided in the sidewall 1 above the offset 7. Above it is a slot 14 which has a tab 15 at its upper edge. From the outside of the sidewall 1 a shouldered part or T-shaped tongue 16 with a hole 17 can be pushed through the slot 14. By means of the projections 18 the tongue 16 is supported by the outside of the sidewall 1 after having penetrated the slot 14. The location of the hole 17 is such that it is exactly vertically above the hole 12 when the tongue 16 is inserted in the sidewall 1. The tab 15 constitutes an upward support for the tongue 16.

The hole 12 in the offset 7 and the hole 17 in the tongue 16 serve to seat the upper and lower reduced ends of a pin 19 for rotatably supporting a gear 20 which may be an integral part of a deflection roller a pulley 21 as illustrated. The deflection roller 21 and gear 20 have a hole 22 fitting the diameter of pin 19.

Basically, the right sidewall 2 may match the left sidewall 1 so that both can be produced using the same stamping die. In the embodiment shown, sidewall 2 has no offset corresponding to offset 7 of the sidewall 1. Instead, a vertical slot 24 is provided next to a horizontal cutout 23. The slot 24 is located to receive a vane 25 of a guide plate or bearing part 26 located outwardly of sidewall 2. The upper and lower edges 27 of the bearing part 26 are bent inwardly toward sidewall 2 thus forming a reinforcement. The bearing part 26 also has a horizontal cutout 28 with an outwardly extending tongue 29 provided with a hole 30. Vertically opposite the tongue 29, on the other side of the cutout 28, a hollow 31 or depression extending vertically is formed into the bearing part 26. Also a dimple 32 at the rim of the bearing part 26 forms a boss on the other side. Such a boss 33 is also provided at the corresponding spot on the sidewall 2 so that both bosses point towards each other. The lower edge 27 of bearing part 26 may be provided with a bearing surface 43 or deflection roller support shelf extending in the same direction as the vane 25, but disposed perpendicular to it.

Another pin 35 is provided to rotatably mount the other deflection roller 34. One flange of this deflection roller 34 is designed in the form of a light barrier disc 36 with radial slots 37. Instead of these slots, however, reflecting webs may also be provided.

In addition, the drawing also shows a compression spring 38 and a light barrier detector device 39 with a transmitting light source and a receiving part (photo cell) 40 and 41, respectively. While a toothed belt 42 is shown in the drawing the invention is also applicable to the use of V-belts, chains, etc. it being understood that the deflection rollers 21 and 34 would be designed accordingly.

The assembly and function of the various parts are as follows:

After the electric motor 8 with the pinion 11 has been mounted to the offset 7, the gear 20 together with the deflection roller 21 and the toothed belt 42 wound around it can be assembled by means of the pin 19 with the periphery of gear 20 accommodated by opening 13. For this purpose, the ends of pin 19 are introduced into the hole 12 in the offset 7 and hole 17 in the tongue 16, respectively, the latter having been pushed through the slot 14 in the sidewall 1. This plug connection secure itself in belt pull direction, arrow A, because the tongue 16 is supported by the outside of the sidewall 1 by means of the projections 18.

The other end of the toothed belt 42 can then be pushed through the cutout 23 in the right sidewall 2 and the cutout 28 in the bearing part 26 and placed on the deflection roller 34. The other pin 35 is then inserted through the deflection roller 34, its one end entering the hole 30 in the tongue 29 of the bearing part 26 and the other end of pin 35 is placed into the hollow 31 at the upper edge of cutout 28. The vane 25 of the bearing part 26 was already inserted earlier into the vertical slot 24 in the sidewall 2. Now the spring 38 can be loaded between sidewall 2 and bearing part 26, to establish and maintain the toothed belt 42 tensioned. Thus, when fluctuations in the mechanical tension occur, the vane 25 of bearing part 26 "plays" in the slot 24, under the pulling action of the toothed belt 42 on the one hand and under the compressive action of the compression spring 38 on the other.

Thus, a simple, yet reliable plug assembly of a device for mounting the deflection rollers of a belt drive is achieved through the invention. In particular, no screw connections are needed. With the exception of the deflection rollers 21 and 34 and of the pins 19 and 35, the individual components can be produced and assembled inexpensively as simple stampings and formed parts.

In equipment or machines in which the rotary motion of one of the deflection rollers 21 or 34 is to be monitored during operation by means of a light barrier device it is expedient to monitor the deflection roller 34. For this purpose, the latter can be provided with a disc 36 whose diameter is a little bigger than required for a mere deflection roller. The light barrier device 39 can be adjustably mounted on the bearing surface 43 on the bearing part 26 so that the disc 36 of the deflection roller 34 is positioned between the transmitting and receiving parts 40, 41. It is to be noted that the bearing surface 43 of the bearing part 26 also projects inwardly through and is supported by the lower edge of the cutout 23. The pulses generated during the rotary motion of the deflection roller 34 by the radial slots 37 or other bright-dark markings can thus be interpreted in a known predetermined manner.

The special advantage of this arrangement is that it suffices to adjust the light barrier device only once relative to the disc 36, namely during its assembly. Since both the disc 36 and the light barrier device 39 participate in the "play" of the bearing part 26, constant and precise monitoring of the rotary motion is assured without the need for a readjustment of the light barrier device 39 at any time.

In an alternative embodiment (not shown) the compression spring 38 may be replaced by an adjusting screw which may be screwed into a tapped hole, say in the area of the dimple 32 and secured by a check nut.

The tension of the toothed belt 42 can thus be fixed once. No "play" of the bearing part 26 will then occur during operation.

In a modification of the embodiment shown in the drawing, the pin 35 may be inserted in a hollows such as 31 at the upper and lower edges of the cutout 28. Instead of the hollows 31, slots may be provided whose widths are smaller than the diameter of the pin 35. In either case, the tongue 29 with hole 30 may be omitted. And a pin 35 without a shoulder, as shown in the drawing could be used.

It is immaterial when applying the invention whether an endless toothed belt is involved to which the e.g. printing head carriage is clamped, or to which both ends of a finite toothed belt are attached.

The invention claimed is:

1. An assembly for mounting first and second shafts rotatably supporting first and second deflection rollers about which a belt is trained and driven comprising, left and right machine side walls having opposite openings and slots, a motor having a pinion gear fixed to its shaft, a shelf extending inwardly from the lower edge of said opening in said left side wall for supporting said motor and said first deflection roller, said first deflection roller having a gear associated therewith for engagement with said pinion gear, a shaft for rotatably supporting said first deflection roller, shouldered means for insertion through said slot in said left side wall above said shelf supported first deflection roller to the extent permitted by engagement of said shoulder and outer left side wall, means for supporting said shaft below and above said shelf supported deflection roller comprising an opening in said shelf and an opening in said shouldered means, a guide plate having a guide for insertion into said slot in said right side wall, a cutout and a shelf extending inwardly from the lower edge of said cutout toward the outer side of the right side wall for insertion into said opening in said right side wall for support by the lower edge thereof, said second deflection roller being supported by said guide plate shelf and being accommodated by said opening in said right side wall and said cutout, a second shaft for rotatably supporting said second deflection roller, means on said guide plate for supporting said second shaft above and below said deflection roller, and means for holding said guide plate spaced outwardly from said right side wall to establish tension in a belt trained about said deflection rollers to maintain said deflection roller mounting assembly.

* * * * *